United States Patent
Lee

(10) Patent No.: US 8,482,481 B2
(45) Date of Patent: Jul. 9, 2013

(54) DUAL-SCREEN ELECTRONIC READING APPARATUS AND DISPLAY METHOD THEREOF

(75) Inventor: Teh-Shen Lee, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 151 days.

(21) Appl. No.: 12/825,551

(22) Filed: Jun. 29, 2010

(65) Prior Publication Data
US 2011/0225210 A1    Sep. 15, 2011

(30) Foreign Application Priority Data
Mar. 12, 2010    (CN) .......................... 2010 1 0123297

(51) Int. Cl.
*G09G 5/00*        (2006.01)
*G06F 7/00*        (2006.01)

(52) U.S. Cl.
USPC .......................................... 345/1.1; 345/901

(58) Field of Classification Search
None
See application file for complete search history.

(56) References Cited

U.S. PATENT DOCUMENTS

| | | | |
|---|---|---|---|
| 7,724,249 B1 * | 5/2010 | Horikawa et al. | 345/418 |
| 2009/0085920 A1 * | 4/2009 | Teng et al. | 345/520 |
| 2009/0295731 A1 * | 12/2009 | Kim et al. | 345/168 |
| 2010/0103074 A1 * | 4/2010 | Chu | 345/1.3 |
| 2011/0175805 A1 * | 7/2011 | Rottler et al. | 345/156 |

* cited by examiner

*Primary Examiner* — Sangwoo Ahn
(74) *Attorney, Agent, or Firm* — Altis Law Group, Inc.

(57) ABSTRACT

A dual-screen electronic reading apparatus includes a memory storing files, a non-volatile display unit, a volatile display unit, and a microprocessor. The microprocessor includes a file determining module configured for determining whether text and at least one image exist in one opened file, and for generating a text file and an image file if both text and at least one image exist in the opened file. The microprocessor also includes a display controlling module configured for displaying the text file on the non-volatile display unit and displaying the image file on the volatile display unit.

9 Claims, 3 Drawing Sheets

DUAL-SCREEN ELECTRONIC READING APPARATUS AND DISPLAY METHOD THEREOF

BACKGROUND

1. Technical Field

The present disclosure relates to electronic reading apparatuses and display methods and, particularly, to an electronic reading apparatus with two screens and a display method thereof.

2. Description of the Related Art

Conventional electronic reading apparatuses usually include electrophoretic displays (EPDs). However, it is difficult for the EPDs to display color images and non-color images because the refresh speed of the EPDs is low, and the response speed of the EPDs is even lower.

BRIEF DESCRIPTION OF THE DRAWINGS

The components of the drawings are not necessarily drawn to scale, the emphasis instead being placed upon clearly illustrating the principles of a dual-screen electronic reading apparatus and a display method thereof. Moreover, in the drawings, like reference numerals designate corresponding parts throughout multiple views.

DETAILED DESCRIPTION

Figure 1:
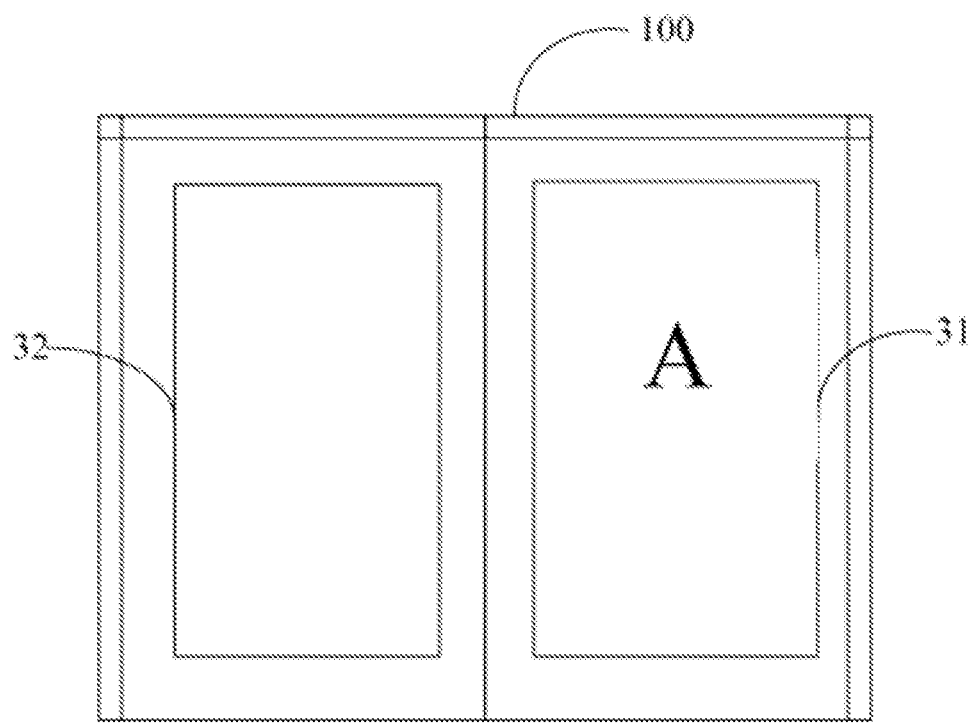
FIG. 1 is a schematic view of a dual-screen electronic reading apparatus in accordance with one embodiment.
Figure 2:
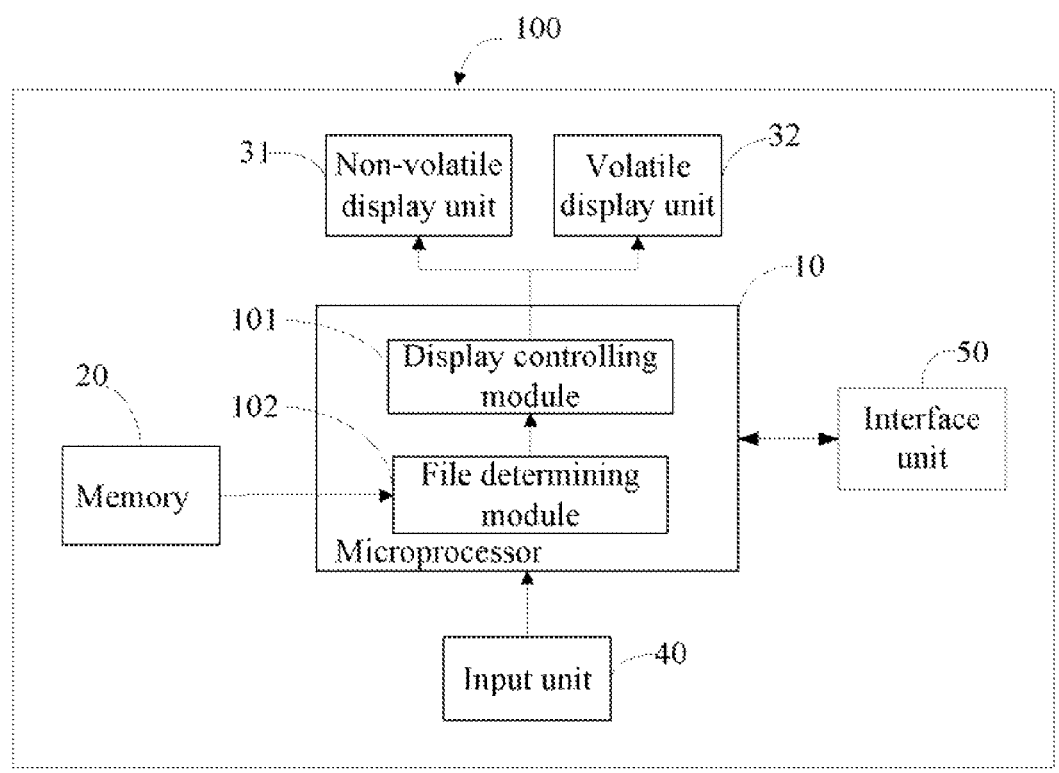
FIG. 2 is a block diagram of the dual-screen electronic reading apparatus of FIG. 1.

Referring to FIGS. 1 and 2, an embodiment of a dual-screen electronic reading apparatus 100 includes a microprocessor 10, a memory 20, a non-volatile display unit 31, a volatile display unit 32, an input unit 40, and an interface unit 50. In one embodiment, the non-volatile display unit 31 is an electrophoretic display (EPD), and the volatile display unit 32 is a Liquid Crystal Display (LCD) or a Cathode-Ray Tube (CRT).

The memory 20 is configured to store a plurality of files. The apparatus 100 can be connected to an external storage device (not shown) or an SD card, for example, via the interface unit 50. Therefore, the apparatus 100 can obtain files from the external storage device.

The input unit 40 is configured to generate an open signal for opening one file in response to user input.

The microprocessor 10 includes a file determining module 102 and a display controlling module 101. The file determining module 102 is configured to read a file from the memory 20 in response to the open signal from the input unit 40, and detects whether text and one or more images simultaneously exist in the opened file. If so, the file determining module 102 generates a text file and an image file. The text file includes the text of the opened file and one or more markers. Each marker indicates that one image in the opened file is displayed at the position of the marker. The image file includes one or more images of the opened file. Each image in the image file includes an identifier associated with one marker. In the embodiment, the shape and the size of each marker can be varied according to need.

In one embodiment, if the file determining module 102 determines text and one or more images exist in the opened file, the display controlling module 101 displays the text file on the non-volatile display unit 31 and the image file on the volatile display unit 32. Because each marker is associated with one image, when one marker is displayed and viewable, the display controlling module 101 can correspondingly cause the image associated with the marker to be displayed and viewed. If the file determining module 102 determines only text exist in the opened file, the display controlling module 101 directly displays the opened file on the non-volatile display unit 31. If the file determining module 102 determines only images exist in the opened file, the display controlling module 101 directly displays the opened file on the volatile display unit 32.

With this arrangement, the electronic reading apparatus 100 displays text on the non-volatile display unit 31 and displays images on the volatile display unit 32, thus increasing the response speed of the electronic reading apparatus 100. Furthermore, the shortcoming of a conventional electronic reading apparatus not being able to display color images is overcome.

Figure 3:
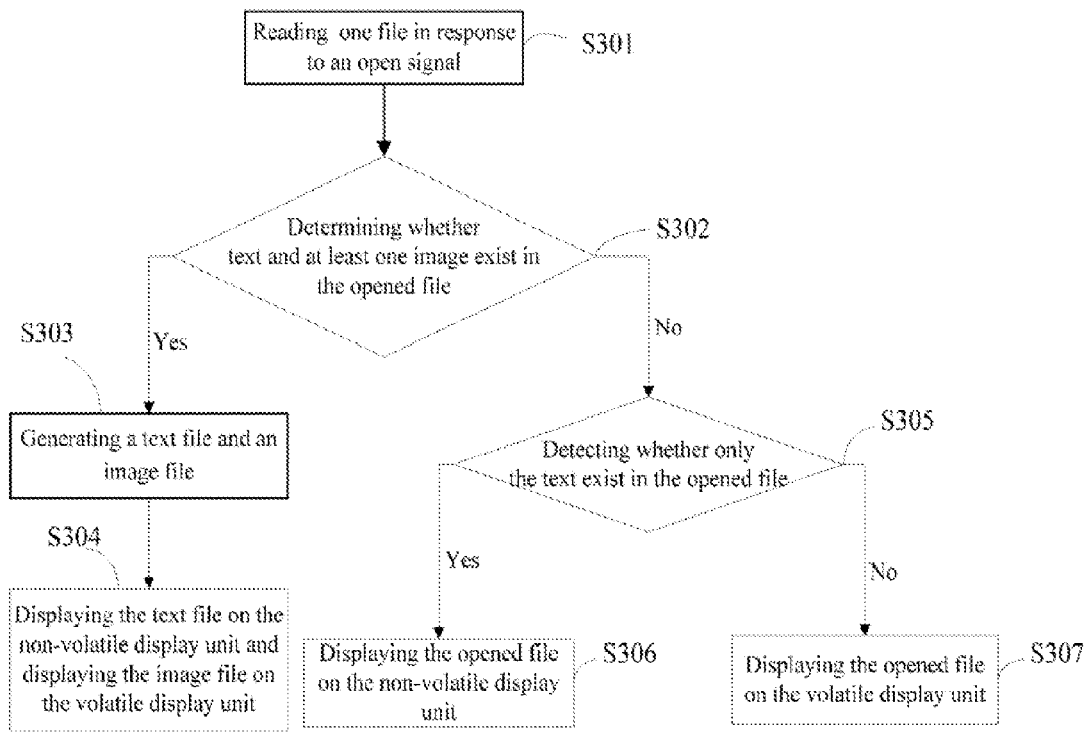
FIG. 3 is a flowchart of a display method applied in the dual-screen electronic reading apparatus of FIG. 1 in accordance with one embodiment.

Referring to FIG. 3, a flowchart of one embodiment of a display method applied in the electronic reading apparatus is illustrated.

In step S301, the file determining module 102 reads one file from the memory 20 in response to the open signal.

In step S302, the file determining module 102 determines whether text and one or more images exist in the opened file. If so, the procedure goes to step S303, otherwise the procedure goes to step S305.

In step S303, the file determining module 102 generates a text file and an image file. The text file includes text of the opened file and one or more markers. Each marker indicates that one image in the opened file is displayed at the position of the marker. The image file includes one or more images of the opened file. Each image in the image file includes an identifier associated with one marker.

In step S304, the display controlling module 101 displays the text file on the non-volatile display unit 31 and displays the image file on the volatile display unit 32.

In step S305, the file determining module 102 detects whether only text exists in the opened file. If so, the procedure goes to step S306, otherwise, the procedure goes to step S307.

In step S306, the display controlling module 101 displays the opened file on the non-volatile display unit 31.

In step S307, the display controlling module 101 displays the opened file on the volatile display unit 32.

Although the present disclosure has been specifically described on the basis of the embodiment thereof, the disclosure is not to be construed as being limited thereto. Various changes or modifications may be made to the embodiment without departing from the scope and spirit of the disclosure.

What is claimed is:

1. A dual-screen electronic reading apparatus, comprising:
a memory storing a plurality of files;
a non-volatile display unit;
a volatile display unit; and
a microprocessor comprising:
a file determining module determining whether text and at least one image exist in one opened file, generating a text file if text exists in the opened file, and generating an image file if at least one image exists in the opened file, wherein the text file records the text of the opened file and at least one marker, the at least one marker indicating a display position of the at least one image in the opened file, and the image file records the at least one image and at least one identifier, the at least one identifier corresponding to the at least one marker; and a display controlling module displaying the text file on the non-volatile display unit and the image file on the volatile display unit simultaneously, wherein displaying the text file comprises displaying the text and the at least one marker, and wherein displaying the image file comprises displaying the at least one image on the volatile display unit according to the presence of the at least one marker on the non-volatile display unit and a relationship between the at least one identifier of the image and the at least one marker.

2. The electronic reading apparatus as described in claim 1, wherein if the file determining module determines that only text exists in the opened file, the display controlling module displays the opened file on the non-volatile display unit.

3. The electronic reading apparatus as described in claim 1, wherein if the file determining module determines only the images exist in the opened file, the display controlling module displays the opened file on the volatile display unit.

4. The electronic reading apparatus as described in claim 1, wherein the non-volatile display unit is an electrophoretic display, and the volatile display unit is an Liquid Crystal Display or a Cathode-Ray Tube.

5. The electronic reading apparatus as described in claim 1, further comprising an interface unit transmitting files from an external storage device to the memory.

6. A display method applied in a dual-screen electronic reading apparatus, comprising:

providing the dual screen electronic reading apparatus comprising a non-volatile display unit and a volatile display unit;

opening and reading one file in response to an opening signal generated in response to a user operation;

determining whether text and at least one image exist in the opened file;

generating a text file if text exists in the opened file, and generating an image file if at least one image exists in the opened file, wherein the text file records the text of the opened file and at least one marker, the at least one markers indicating a display position of the at least one image in the opened file, and the image file records the at least one image and at least one identifier, the at least one identifier corresponding to the at least one markers; and displaying the text file on the non-volatile display unit and the image file on the volatile display unit simultaneously, wherein displaying the text file comprises displaying the text and the at least one marker, and wherein displaying the image file comprises displaying the at least one image on the volatile display unit according to the presence of the at least one marker on the non-volatile display unit and a relationship between the at least one identifier of the image and the at least one marker.

7. The display method as described in claim 6, further comprising:

determining if only the text exists in the opened file; and displaying the opened file on the non-volatile display unit if only the text exists in the opened file.

8. The display method as described in claim 6 further comprising:

determining if only the at least one images exists in the opened file; and displaying the opened file on the volatile display unit if only the at least one images exists in the opened file.

9. The display method as described in claim 6, wherein the non-volatile display unit is an electrophoretic display, and the volatile display unit is an Liquid Crystal Display or a Cathode-Ray Tube.

* * * * *